United States Patent [19]

Dellner

[11] B 3,983,762
[45] Oct. 5, 1976

[54] SPROCKET WHEEL FOR SCRAPER ELEVATOR DEVICE

[75] Inventor: Raymond P. Dellner, Strongsville, Ohio

[73] Assignee: General Motors Corporation, Detroit, Mich.

[22] Filed: Mar. 17, 1975

[21] Appl. No.: 558,818

[44] Published under the second Trial Voluntary Protest Program on January 13, 1976 as document No. B 558,818.

[52] U.S. Cl. .............................. 74/243 C; 74/229; 74/230.5; 198/728; 198/834
[51] Int. Cl.[2] ...................... F16H 1/00; B60P 1/36
[58] Field of Search ....... 74/243 R, 243 C, 243 NC, 74/229, 230.5; 37/101, 102, 108 R, 110, 8; 198/172, 173, 174, 175, 176, 198

[56] References Cited
UNITED STATES PATENTS

| | | | |
|---|---|---|---|
| 2,322,967 | 6/1943 | Perry | 74/231 C |
| 2,803,504 | 8/1957 | Lynch | 74/231 C |
| 2,984,120 | 5/1961 | Hurry | 74/229 |
| 3,161,280 | 12/1964 | Creighton | 198/174 |
| 3,206,876 | 9/1965 | Penote et al. | 74/243 R |
| 3,416,385 | 12/1968 | Schenk | 74/243 R |
| 3,758,966 | 9/1973 | Miller | 37/8 |
| 3,831,358 | 8/1974 | Marsh et al. | 74/231 J |
| 3,899,219 | 8/1975 | Boggs | 74/243 R |

FOREIGN PATENTS OR APPLICATIONS

| | | | |
|---|---|---|---|
| 2,011,781 | 9/1971 | Germany | 74/243 R |

*Primary Examiner*—Samuel Scott
*Assistant Examiner*—A. Russell Burke
*Attorney, Agent, or Firm*—Edward J. Biskup

[57] ABSTRACT

A sprocket wheel for use with an elevator device that employs endless flexible belts having a plurality of teeth attached to the inner surface thereof. The sprocket wheel includes a disc which has the periphery thereof formed with planar and arcuate surfaces and has driver members spaced outwardly from the opposite sides of the disc for engaging the teeth of the belt.

3 Claims, 10 Drawing Figures

SPROCKET WHEEL FOR SCRAPER ELEVATOR DEVICE

My copending patent application identified as Ser. No. 558,819 and entitled "Belt Drive For Scraper Elevator Device" concerns an elevator device for an elevating scraper that dispenses with the usual chains for supporting and driving the flight members and substitutes flexible endless belts for such use. The endless belts tend to eliminate wear of the type normally experienced by chains and also improve the stability of the flight members as they move between and wrap around the sprocket wheels. The belt is made in sections with each belt section including a plurality of parallel strands of wire cable that are securely anchored at the opposite ends to a transverse support member. Both the cables and the support members are encased within an elastomeric material. Each flight member is supported on the belt member by an over/under mounting which locates a primary mounting point adjacent the inner surface of the belt member and locates a secondary mounting point adjacent the outer surface of the belt member.

The present invention concerns a sprocket wheel for use with an elevator device having belt drives of the type described above that have teeth attached to the inner surface thereof. More specifically, the sprocket wheel according to this invention includes a disc having a plurality of planar surfaces and arcuate surfaces alternately formed along the periphery of the disc. In the preferred form, the planar surfaces are of equal longitudinal length while the arcuate surfaces have chords of equal length. A plurality of driver members are secured to the disc on each side thereof with each driver member being spaced laterally from and being located adjacent to an arcuate surface. Thus, the driver members are arranged in pairs for meshing engagement with the teeth carried by the inner surface of the belt members.

The objects of the present invention are to provide a new and improved sprocket wheel for use with interconnected flexible belt sections that includes a disc having a plurality of planar surfaces formed along the periphery thereof that serve as supports for the connected ends of the belt sections; to provide a new and improved sprocket wheel for a scraper elevator device that is combined with a flexible belt having a plurality of teeth attached to the inner surface thereof and that has a plurality of driver members that are laterally spaced from a support disc for engaging the teeth; and to provide a new and improved sprocket wheel for a scraper elevator that is formed as a disc with the sides thereof supporting driver members and with the periphery of the disc having alternate sections thereof formed so as to eliminate a build-up of material on the pulley and the driven belt members.

Other objects and advantages of the present invention will be apparent from the following detailed description when taken with the drawings in which.

Figure 1:
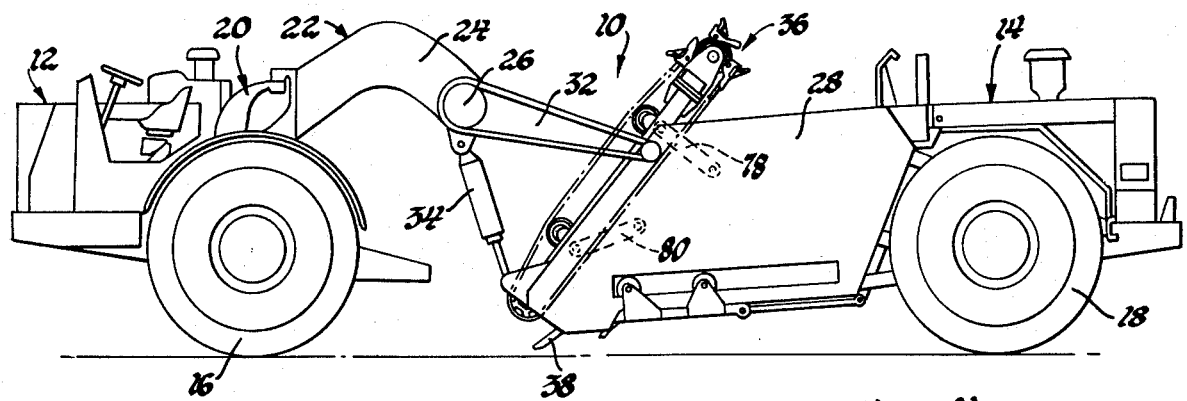
FIG. 1 shows an elevating scraper incorporating an elevator device having sprocket wheels made in accordance with the invention.
Figure 2:
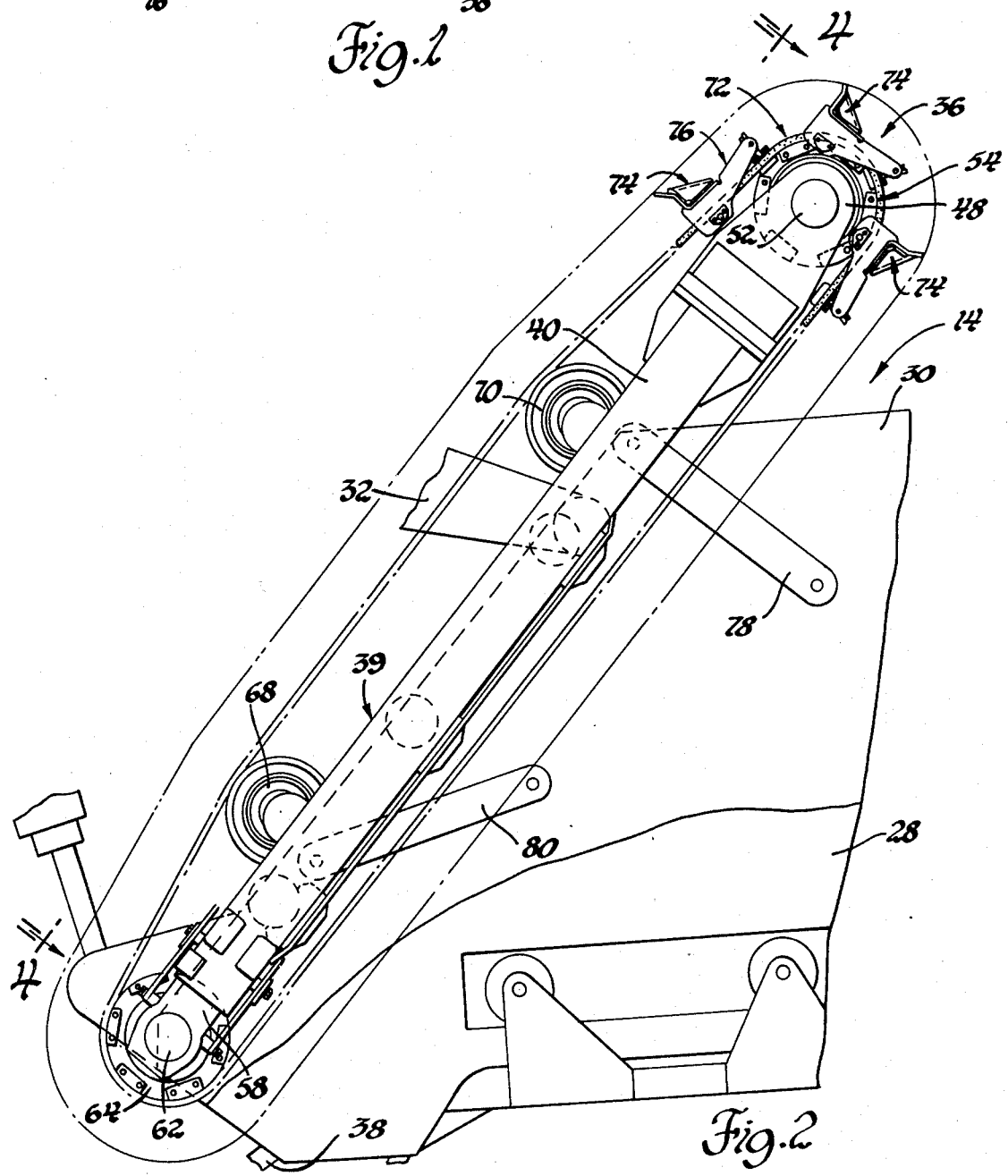
FIG. 2 is an enlarged side view of the elevator device incorporated with the scraper shown in FIG. 1.

Referring to the drawings and more particularly FIGS. 1 and 2 thereof, an elevating scraper 10 is shown having the usual overhung tractor 12 and a trailing scraper bowl 14 respectively supported in the usual manner by rubber tires 16 and 18. The tractor 12 is connected through a universal coupling 20 to a pull yoke 22 including a goose neck 24 with a transverse torque tube 26. As is conventional, the opposite ends of the torque tube 26 are provided with laterally spaced pull arms the rearward ends of which are connected by transversely aligned pivot connections to the spaced side walls 28 and 30 of the scraper bowl 14. Each of the pull arms incorporated with the scraper 10 is identified by reference numeral 32. As is conventional with elevating scrapers of this type, the front end of the scraper bowl 14 is supported by a pair of bowl cylinders each of which is identified by the reference numeral 34. Each bowl cylinder 34 has its cylinder end pivotally connected to the torque tube 26 adjacent one end thereof and has its piston rod pivotally connected to the forward end of the associated side wall of the scraper bowl 14. The bowl cylinders serve to move the scraper bowl 14 between the raised carry-position of FIG. 1 and a lowered dig-position.

Figure 3:
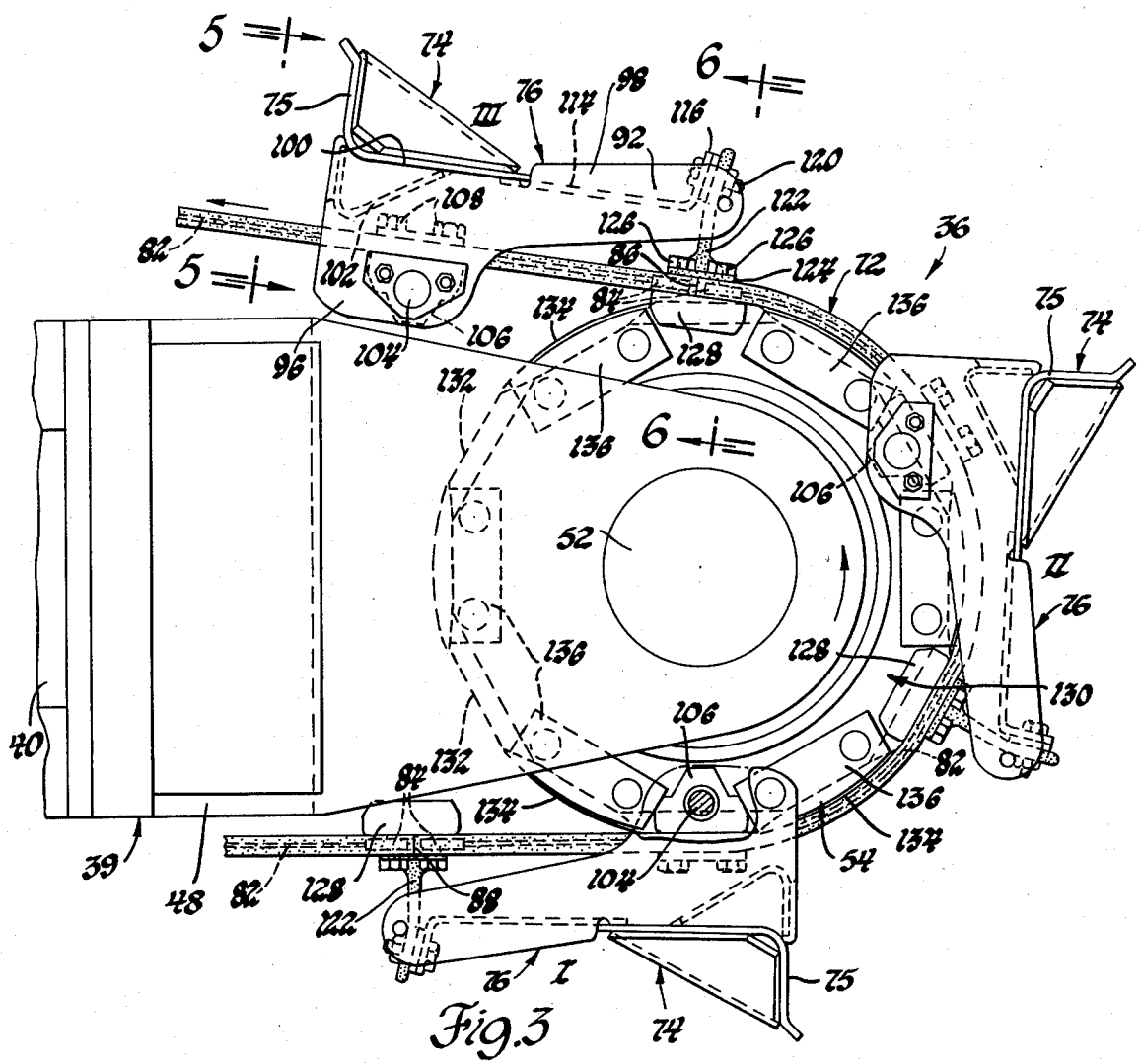
FIG. 3 is a further enlarged view of the upper end of the elevator device of FIG. 2 and shows one of the sprocket wheels according to the invention combined with the belt member which supports the elevator flight members.
Figure 4:
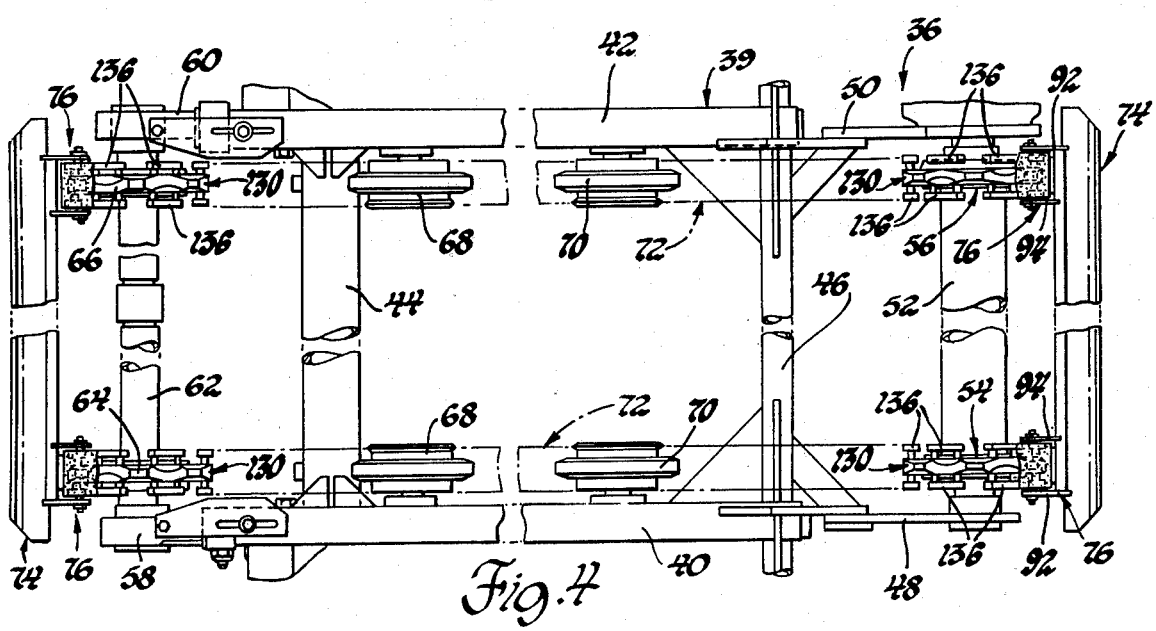
FIG. 4 is a view taken on lines 4—4 of FIG. 2.

The front open end of the scraper bowl 14 is provided with an elevator device 36 the lower end of which is positioned above a transverse cutting blade 38 extending between the side walls 28 and 30. As seen in FIGS. 2, 3 and 4 the elevator device 36 includes a support frame 39 having side rails 40 and 42 rigidly interconnected by transverse cross members 44 and 46. The upper end of side rails 40 and 42 are rigidly formed with spaced brackets 48 and 50 which rotatably support a shaft 52 which carries a pair of laterally spaced drive sprocket wheels 54 and 56. Similarly, the lower ends of the side rails 40 and 42 are provided with arms 58 and 60 which rotatably support a shaft 62 having laterally spaced idler sprocket wheels 64 and 66 mounted thereon. At this juncture, it will be noted that the drive and idler sprocket wheels 54, 56, 64 and 66 are identical in construction and each is made according to the invention.

As seen in FIG. 2, a pair of guide rollers 68 and 70 are rotatably mounted to each of the side rails 40 and 42 and together with the drive and idler sprocket wheels serve to support an endless flexible belt 72. Thus, each vertically aligned set of drive sprocket wheel, idler sprocket wheel, and guide rollers have an identical endless belt 72 entrained thereabout which supports the outer ends of a plurality of parallel flight members 74 each of which includes an elongated ground contact plate 75 that is L-shaped in cross section and that extends transversely between the spaced belt members. The flight members 74 are uniformly spaced along the entire outer surface of the belt and have the opposite ends thereof secured to the laterally spaced belts through a mounting assembly generally indicated by the reference numeral 76. In addition, each side rail of the support frame 39 is connected to the associated side wall of the scraper bowl 14 by a pair of links 78 and 80 which allow the elevator device 36 to be movable in the usual manner in an upward direction a predetermined amount and be spaced from the cutting blade 38 by an appropriate stop member (not shown) which limits the downward movement of the lower link 80.

Each belt 72 is composed of a plurality of separate sections which are interconnected to form an endless belt. Each section has apertures therein at appropriate places for connecting the mounting assemblies 76 of each flight member 74 to the belt 72 and for joining the sections together. In addition, each section of the belt 72 includes a plurality of elongated wire cables 82 located along parallel axes and having the opposite ends thereof secured to connector bars 84 which are then interconnected by cap screws hereinafter to be described at the junctures such as indicated by the numerals 86 and 88 in FIG. 3. The cables 82 as well as the connector bars 84 are completely embedded within a generally rectangular block of an elastomeric material 90. One method for manufacturing belt sections of this type can be seen in U.S. Pat. No. 3,091,837, in the name of D. B. McCormick and assigned to the assignee of this invention.

Figure 5:
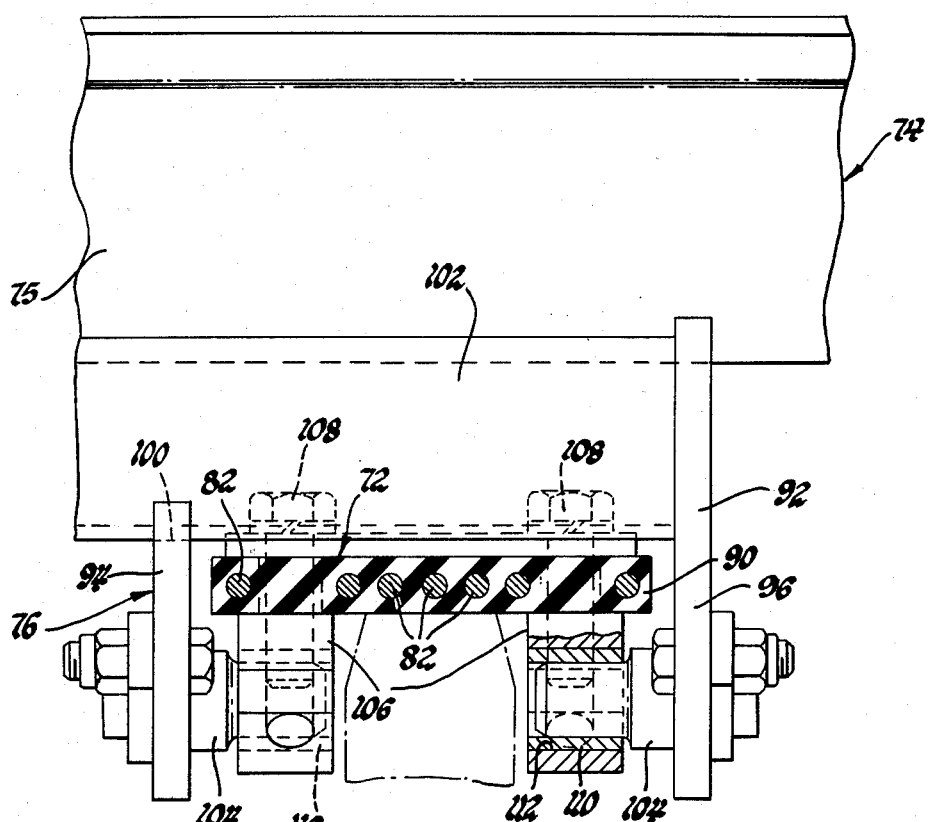
FIG. 5 is an enlarged sectional view taken on lines 5—5 of FIG. 3.

The mounting assembly 76 connecting each end of a flight member 74 to the associated belt 72 can be seen in FIGS. 3, 4 and 5 as comprising a pair of substantially identical support plates 92 and 94 located on opposite sides of the belt 72. The support plate 92 is formed with an enlarged portion 96 and an arm 98 that extends therefrom with the enlarged portion having an outer support surface 100 to which the ground contact plate 75 of the associated flight member is rigidly connected. In addition, the inner side wall of the support plate 92 is fixed with one end of a V-shaped channel member 102 the legs of which are rigid with the underside of the ground contact plate 75. The channel member 102 extends transversely for rigid connection with the side wall of a similar support member 92 attached to the endless belt 72 on the opposite side of the support frame 39 as seen in FIG. 4. The other support plate 94 is, as mentioned above, identical to the support plate 92 but has a V-shaped cut-out portion in its enlarged portion that is secured to and accommodates the underside of the channel member 102.

Figure 6:
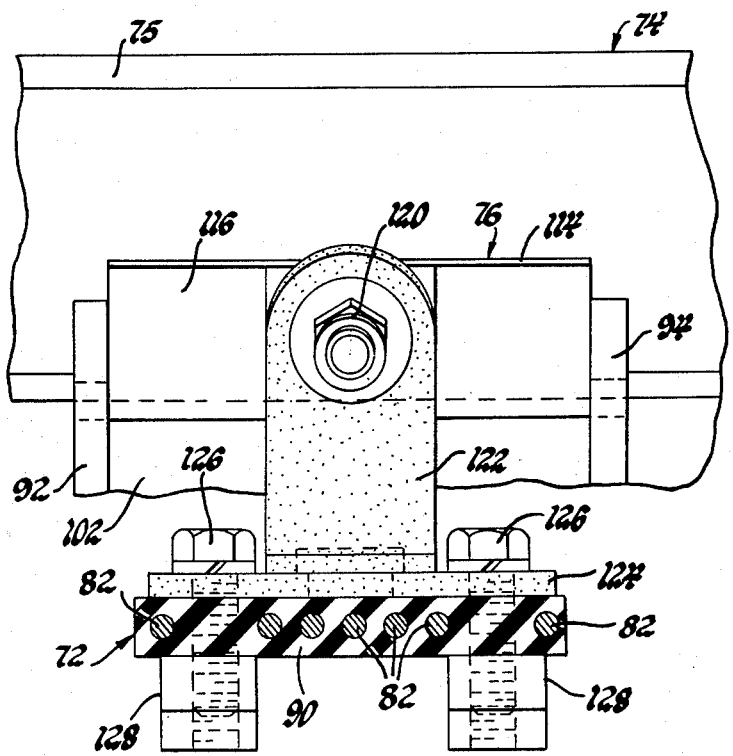
FIG. 6 is an enlarged sectional view taken on line 6—6 of FIG. 3.

As seen in FIG. 5, each of the support plates 92 and 94 supports a stub shaft 104 which extends towards the belt 72 and is received within a generally V-shaped tooth 106 fastened to the belt 72 adjacent one side thereof and between a pair of cables 82 by a pair of cap screws 108. It should be understood that the stub shafts 104 carried by the support plates 92 and 94 of each mounting assembly are aligned along a transverse horizontal axis and each stub shaft extends into a bushing 110 press-fitted within a bore 112 formed in the associated tooth. The arms 98 of each pair of the support plates 92 and 94 are interconnected by a cross member 114 having a flange 116 through which a bolt 120 extends for connection with an outer end of a flexible strap 122. Thus, as seen in FIGS. 3 and 6, the strap 122 is preferably formed from an elastomeric material and has the lower end thereof provided with an integral base 124 which is bolted to the belt 72 through four cap screws 126 each pair of which is threadably received by and secured to a tooth 128 located at the inner surface of the belt 72. The cap screws 126 at the junctures 86 and 88 also serve to interconnect the belt sections. It will be understood that, as seen in FIG. 3, spacing of the bolts along the longitudinal axis of the belt 72 is the same for each tooth 106 and 128.

As aforementioned, the drive sprocket wheels 54 and 56 and the idler sprocket wheels 64 and 66 are identical in construction and, as seen in FIGS. 3 and 7–10, each sprocket wheel consists of a disc 130 which has a plurality of planar surfaces 132 and arcuate surfaces 134 formed along the periphery thereof. The planar surfaces 132 are of equal longitudinal length and the arcuate surfaces have chords of equal length. Adjacent to and on opposite sides of each of the arcuate surfaces 134, a pair of identical driver members 136 are rigidly connected to the disc 130 and extend outwardly therefrom. Each driver member 136 is generally rectangular in configuration having an outer surface 138 that is curved and located radially inwardly from the arcuate surface 134 so as not to be in axial alignment with that segment of the peripheral surface of the disc member 130. Also each driver member 136 is rigidly supported by the corresponding ends of a pair of identical pins 140 and 142 press-fitted in the disc 130. The spacing between the driver members 136 along the circumference of the disc 130 is such that the teeth 106 and 128 attached to the inner surface of the belt 72 and associated with the mounting assembly 76 of each flight member are adapted to move between each adjacent pair of driver members on the drive and idler sprocket wheels.

Figure 7:
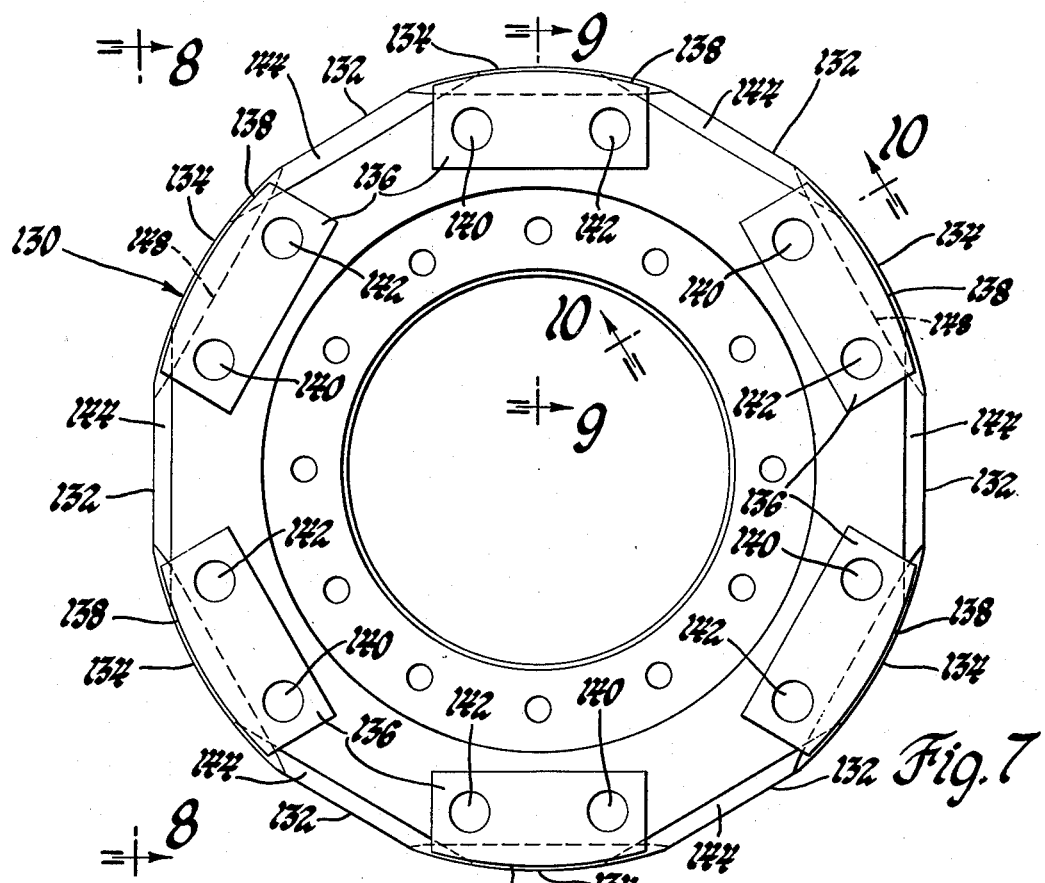
FIG. 7 is a further enlarged view of the sprocket wheel of FIG. 3 and shows in detail the construction of the sprocket wheel.
Figure 8:
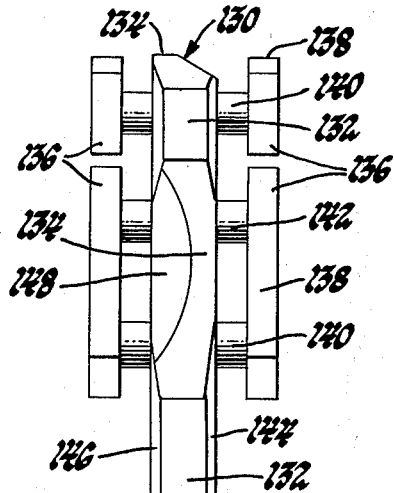
FIG. 8 is an end view taken on line 8—8 of FIG. 7.
Figure 9:
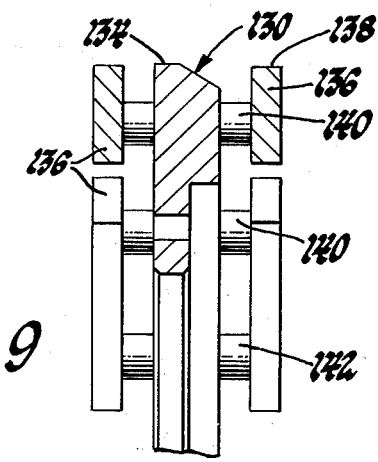
FIG. 9 is a sectional view taken on line 9—9 of FIG. 7.
Figure 10:
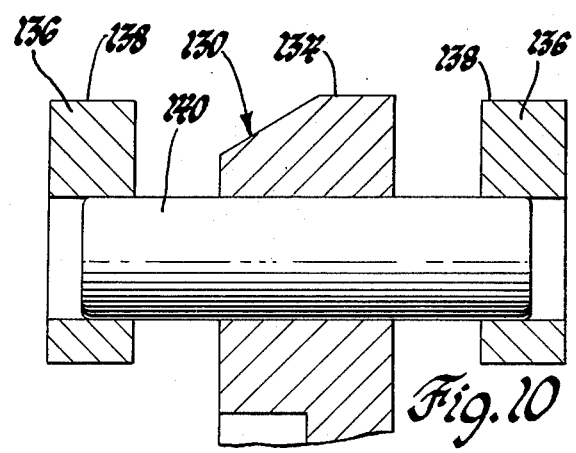
FIG. 10 is an enlarged view taken on line 10—10 of FIG. 7.

As best seen in FIGS. 7 and 8, each planar surface 132 is bounded on opposite sides by radially inwardly tapered side walls 144 and 146 while each arcuate surface 134 is scalloped along one side thereof so as to provide a depressed well 148. The well 148 is formed on alternating sides of successive arcuate surfaces. Both the tapered walls 144, 146 and the wells 148 help to prevent material from accumulating on the sprocket wheel. In addition, the planar surfaces 132 serve to support the belt sections at the juncture points, as seen in FIG. 3, and thereby minimize bending of the wire ropes in this area. It will also be noted that inasmuch as each arcuate surface 134 extends radially outwardly further than the outer surface 138 of the associated driver members, a bending of the belt in a transverse plane occurs as the belt engages the arcuate surface. Thus, a cleaning action is provided at this point to remove material that may be clinging to the inner and outer surfaces of the belt.

In operation and as seen in FIGS. 2 and 4, a hydraulic rotary motor (not shown) drivingly rotates the upper shaft 52 in a counterclockwise direction causing the spaced sprocket wheels 54 and 56 to drive the associated belts 72 in a counterclockwise direction about the drive and idler sprocket wheels. As the lower run of the belt 72 moves towards the drive sprocket wheel 54 as seen in FIGS. 3 and 5, the teeth 106 straddle the periphery of the disc 130 and move into the space provided between a pair of adjacent driver members 136. As the mounting assembly 76 moves from the position indicated by the Roman numeral I to the position indicated by the Roman numeral II, the distance between the centers of the teeth 106 and 128, as measured along the longitudinal axis of the belt 72, decreases due to the curvature of the drive sprocket wheel 54. At the same time, the distance between the center of the stub shaft 104 and the upper connected end of the strap 122 remains constant. The shortening of the distance between the teeth 106 and 128 is compensated for by a bending of the strap 122 associated with the mounting assembly 76. As the mounting assembly 76 moves from the position indicated by the Roman numeral II to that indicated by Roman numeral III, the distance between the teeth 106 and 128 increases and the strap 122 returns to its normal position.

Various changes and modifications can be made in this construction without departing from the spirit of the invention. Such changes and modifications are contemplated by the inventor and he does not wish to be limited except by the scope of the appended claims.

I claim:

1. A sprocket wheel for an elevator device adapted to be mounted in the open front end of a scraper bowl and including a flexible endless belt member having a plurality of teeth rigidly connected to the inner surface of the belt member, said sprocket wheel comprising a disc having a plurality of planar surfaces and arcuate surfaces alternately formed along the periphery thereof, the planar surfaces being of equal longitudinal length and said arcuate surfaces having chords of equal length, a pair of driver members spaced laterally from the disc and located adjacent to and on opposite sides of each of said arcuate surfaces, and means rigidly connecting said driver members to said disc whereby said driver members transmit drive to the teeth of the belt member when the sprocket wheel is driven.

2. A sprocket wheel for an elevator device adapted to be mounted in the open front end of a scraper bowl and including a flexible endless belt member composed of a plurality of interconnected belt sections having longitudinally extending and parallel wire ropes embedded therein, a plurality of teeth rigidly connected to the inner surface of each of said belt sections, said sprocket wheel comprising a disc having a plurality of circumferentially and equally spaced planar surfaces formed along the periphery thereof, the planar surfaces being of equal longitudinal length and adapted to serve as supports for the connected ends of the belt sections, a pair of driver members spaced laterally from the disc on opposite sides thereof and located between each pair of adjacent planar surfaces, and means rigidly connecting said driver members to said disc whereby said driver members transmit drive to the teeth of the belt member when the sprocket wheel is driven.

3. A sprocket wheel for an elevator device adapted to be mounted in the open front end of a scraper bowl and including a flexible endless belt member having a plurality of teeth rigidly connected to the inner surface of the belt member, said sprocket wheel comprising a disc having a plurality of planar surfaces and arcuate surfaces alternately formed along the periphery thereof, the planar surfaces being of equal longitudinal length and said arcuate surfaces having chords of equal length, each planar surface being bounded on opposite sides thereof with radially inwarded tapered side walls, each arcuate surface being scalloped along one side of the disc so as to provide a depressed well formed therein, a pair of driver members spaced laterally from the disc and located adjacent to and on opposite sides of each of said arcuate surfaces, each of said driver members having an outer surface of a curved configuration conforming to the adjacent arcuate surface, and means rigidly connecting said each pair of driver members to said disc so that the outer surfaces of the driver members are spaced radially inwardly from the adjacent arcuate surface whereby the belt member is bent in a transverse plane as the driver members engage the teeth of the belt member.

* * * * *